(12) United States Patent
Ishihara et al.

(10) Patent No.: US 12,658,467 B2
(45) Date of Patent: Jun. 16, 2026

(54) ALL-SOLID-STATE BATTERY

(71) Applicant: SAMSUNG SDI CO., LTD., Yongin-si (KR)

(72) Inventors: Hiroe Ishihara, Yokohama (JP); Yuichi Aihara, Yokohama (JP); Taku Watanabe, Yokohama (JP); Satoshi Fujiki, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 628 days.

(21) Appl. No.: 17/923,881

(22) PCT Filed: May 3, 2021

(86) PCT No.: PCT/KR2021/005570
§ 371 (c)(1),
(2) Date: Nov. 7, 2022

(87) PCT Pub. No.: WO2021/225346
PCT Pub. Date: Nov. 11, 2021

(65) Prior Publication Data
US 2023/0187685 A1     Jun. 15, 2023

(30) Foreign Application Priority Data

May 7, 2020   (JP) ................................. 2020-081818
Feb. 9, 2021   (KR) ........................ 10-2021-0018561

(51) Int. Cl.
H01M 10/0525     (2010.01)
H01M 4/02     (2006.01)
(Continued)

(52) U.S. Cl.
CPC ... H01M 10/0525 (2013.01); H01M 10/0585 (2013.01); H01M 50/103 (2021.01); *H01M 2004/027* (2013.01); *H01M 2004/028* (2013.01)

(58) Field of Classification Search
CPC ......... H01M 10/0562; H01M 10/0525; H01M 10/0585; H01M 50/103
See application file for complete search history.

(56) References Cited

U.S. PATENT DOCUMENTS

| | | | |
|---|---|---|---|
| 5,494,762 A | 2/1996 | Isoyama et al. | |
| 6,030,728 A | 2/2000 | Cotte et al. | |

(Continued)

FOREIGN PATENT DOCUMENTS

| | | |
|---|---|---|
| CN | 104919628 A | 9/2015 |
| EP | 3386006 A1 | 10/2018 |

(Continued)

OTHER PUBLICATIONS

Chinese Office Action corresponding to CN Application No. 202180033620.3, dated Jul. 23, 2025 (6 pages).

(Continued)

*Primary Examiner* — Sarah A. Slifka
(74) *Attorney, Agent, or Firm* — Womble Bond Dickinson (US) LLP

(57) ABSTRACT

An embodiment provides a stacked all-solid-state secondary battery in which a plurality of battery units in which a positive electrode layer, a solid electrolyte layer, and a negative electrode layer are sequentially stacked are stacked along the stacking direction, wherein a buffer layer formed between the adjacent battery units.

9 Claims, 6 Drawing Sheets

(51) Int. Cl.
  *H01M 10/0585*   (2010.01)
  *H01M 50/103*   (2021.01)

(56)     References Cited

U.S. PATENT DOCUMENTS

| | | | |
|---|---|---|---|
| 9,324,502 | B2 | 4/2016 | Yasuda et al. |
| 9,793,522 | B2 | 10/2017 | Bhardwaj et al. |
| 2002/0076605 | A1 | 6/2002 | Akashi et al. |
| 2004/0185336 | A1 | 9/2004 | Ito et al. |
| 2006/0078787 | A1 | 4/2006 | Sato et al. |
| 2013/0189563 | A1 | 7/2013 | Chang et al. |
| 2015/0357674 | A1 | 12/2015 | Haga et al. |
| 2016/0197332 | A1 | 7/2016 | Lee et al. |
| 2017/0040644 | A1 | 2/2017 | Lupart et al. |
| 2019/0006652 | A1 | 1/2019 | Kim |
| 2019/0088978 | A1 | 3/2019 | Langlois et al. |
| 2019/0157723 | A1 | 5/2019 | Suzuki et al. |
| 2019/0280329 | A1 | 9/2019 | Waseda |
| 2019/0326626 | A1 | 10/2019 | Kano et al. |
| 2020/0373565 | A1 | 11/2020 | Yawata et al. |
| 2021/0020995 | A1 | 1/2021 | Ohta et al. |

FOREIGN PATENT DOCUMENTS

| | | | |
|---|---|---|---|
| JP | 3259850 | B2 | 2/2002 |
| JP | 2002-110239 | A | 4/2002 |
| JP | 2004-273436 | A | 9/2004 |
| JP | 4612321 | B2 | 1/2011 |
| JP | 2011-086554 | A | 4/2011 |
| JP | 2012-178308 | A | 9/2012 |
| JP | 5371403 | B2 | 12/2013 |
| JP | 2015-232976 | A | 12/2015 |
| JP | 2019-061861 | A | 4/2019 |
| JP | 2019-096610 | A | 6/2019 |
| JP | 2019-153535 | A | 9/2019 |
| JP | 2019-192628 | A | 10/2019 |
| KR | 10-2002-0022015 | A | 3/2002 |
| KR | 10-1747398 | B1 | 6/2017 |
| KR | 10-1769820 | B1 | 8/2017 |
| KR | 10-1970250 | B1 | 4/2019 |
| KR | 10-2019-0124396 | A | 11/2019 |
| WO | WO 2014/162532 | A1 | 10/2014 |
| WO | WO 2019-188487 | A1 | 10/2019 |
| WO | WO 2019/189007 | A1 | 10/2019 |
| WO | WO 2020/031810 | A1 | 2/2020 |

OTHER PUBLICATIONS

International Search Report for corresponding Application No. PCT/KR2021/005570, dated Aug. 17, 2021, 6 pp.

Japanese Office Action dated Jun. 4, 2024, issued in corresponding Japanese Patent Application No. 2020-081818 (8 pages).

EPO Extended European Search Report dated Sep. 19, 2024, issued in corresponding European Patent Application No. 21799750.1 (9 pages).

(a)

Sample A (b)

Sample B

ALL-SOLID-STATE BATTERY

CROSS-REFERENCE TO RELATED APPLICATIONS

This application is a U.S. National Phase Patent Application of International Application Number PCT/KR2021/005570, filed on May 3, 2021, which claims priority to Japanese Patent Application No. 2020-081818, filed on May 7, 2020, and Korean Patent Application Number 10-2021-0018561, filed on Feb. 9, 2021, the entire content of each of which is incorporated herein by reference.

TECHNICAL FIELD

It relates to an all-solid-state battery.

BACKGROUND ART

Recently, all-solid-state secondary batteries using a solid electrolyte as an electrolyte have been attracting attentions (e.g., Patent Reference 1). In the all-solid-state secondary batteries, solid electrolyte powder is compressed and solidified to form an electrolyte layer.

As such all-solid-state secondary batteries, a stacked all-solid-state secondary battery, in which a plurality of battery units (also, referred to as single cells) manufactured by sequentially stacking a positive electrode layer, a solid electrolyte layer, and a negative electrode layer are stacked, is known. In the stacked all-solid-state secondary battery, each battery unit is repeatedly expanded and contracts, when repeatedly charged and discharged, generating a pressure between neighboring battery units. Herein, since the expansion or contraction of each battery unit are not uniform but biased in an inner direction of the stacking surface (a direction perpendicular to the stacking direction), a non-uniform pressure is applied to each battery unit in the inner direction of the stacking surface. Accordingly, when repeatedly charged and discharged, the electrolyte layer of each battery unit is gradually cracked or deformed, causing a problem of deteriorating battery characteristics such as cycle characteristics and the like.

(Patent reference 1: Japanese Patent Laid-open No. 2011-086554)

DISCLOSURE

Technical Problem

An object of the present invention is to reduce a bias of pressure applied to each of the battery units involved in charging and discharging in a stacked all-solid-state secondary battery.

Technical Solution

That is, the all-solid-state secondary battery of the present invention is a stacked all-solid-state secondary battery in which a plurality of battery units configured by sequentially stacking a positive electrode layer, a solid electrolyte layer, and a negative electrode layer are stacked in the stacking direction and a buffer layer is formed between adjacent battery units.

Through the above configuration, a buffer layer is provided between adjacent battery units to charge an all-solid-state secondary battery to distribute a pressure when the battery unit expands, and to reduce a pressure bias applied to each battery unit according to charging and discharging. Through this, cracking or deformation of the electrolyte layer due to repeated charging and discharging may be suppressed, and deterioration of battery characteristics such as cycle characteristics may be suppressed.

In the all-solid-state secondary battery, it is preferable that a sum of thicknesses of the buffer layer along the stacking direction is greater than a sum of changes of the thickness of the battery unit along the stacking direction accompanying charging and discharging.

Through this, the change in the thickness of the battery unit accompanying charging and discharging may be reliably absorbed by the buffer layer, and the bias of the pressure applied to each battery unit according to the charging and discharging may be further reduced.

On the other hand, the "change amount accompanying charging and discharging" means an amount of change when the all-solid-state battery is changed from a fully charged state to a discharged state. The "fully charged state" refers to a state in which the state of charge (SOC) of the all-solid-state battery is greater than or equal to 90%, and the "discharged state" refers to a state in which the SOC of the all-solid-state battery is less than or equal to 10%. In addition, the "SOC of the all-solid-state battery" means a ratio of a total value of a remaining capacity of the battery unit to a total value of a rated capacity of each battery unit.

In addition, the "sum of the thickness of the buffer layer" means a sum of the thicknesses of the plurality of buffer layers when the all-solid-state secondary battery includes a plurality of buffer layers, and it means a thickness of one buffer layer when only one buffer layer is provided. In addition, the "sum of the change amount of the thickness of the battery unit" means a sum of changes of the thickness of all the battery units included in the all-solid-state secondary battery.

As a specific embodiment of the all-solid-state secondary battery, in the battery unit, lithium ions move between the positive electrode layer and the negative electrode layer to cause charging and discharging.

The buffer layer preferably has a smaller elastic modulus than those of the positive electrode layer and the negative electrode layer. Thereby, when the battery unit expands due to charging and discharging, the buffer layer elastically deforms to more reliably absorb a change in volume of the battery unit, so that a bias of pressure applied to each battery unit may be further reduced.

In an embodiment, in the all-solid-state secondary battery, a sum of thicknesses of the positive electrode layer, the solid electrolyte layer, and the negative electrode layer in the stacking direction may be greater in the fully charged state than in the discharged state.

In an embodiment, the all-solid-state secondary battery may be in a state in which a lithium metal layer is precipitated between the negative electrode current collector and the negative electrode active material layer provided in the negative electrode layer in a fully charged state.

In addition, in the all-solid-state secondary battery, a sum of the thicknesses along the stacking direction of the negative electrode current collector and the negative electrode active material layer provided in the negative electrode layer in a fully charged state is preferably smaller than a thickness of the lithium metal layer precipitated between the negative electrode current collector and the negative electrode active material layer along the stacking direction.

Thereby, a volume energy density at the time of full charge is high, and a dissolution and precipitation of lithium may be repeated stably.

In an embodiment, in the all-solid-state secondary battery, when the specific capacity per unit area of the positive electrode layer is X [mAh/cm$^{-2}$], the thickness of the lithium metal layer in a fully charged state along the stacking direction may be greater than or equal to 4.85×X μm.

The all-solid-state secondary battery preferably further includes a rectangular case for accommodating the plurality of battery units and the buffer layer, wherein the case has an opposite surface having the smallest area among the three pairs of opposite surfaces as a bottom surface, and the plurality of battery units and the buffer layer are accommodated in the case so as to be stacked along the height direction.

Thereby, when the battery units expand due to charging and discharging, the bias of the pressure applied to each of the battery units may be further reduced.

In an embodiment, when viewed in the stacking direction, an area of the buffer layer may be larger than an area of the battery unit.

In an embodiment, the battery units may be connected in parallel to each other, and the buffer layer between the battery units may be made of an insulating material. In this case, it is preferable that an insulating film having a thickness smaller than that of the buffer layer is installed between the battery unit and the buffer layer adjacent to each other.

In another embodiment, the battery units may be connected in series with each other, and the buffer layer between the battery units may be made of a conductive material.

Advantageous Effects

Through the present invention, it is possible to reduce the bias of pressure applied to each of the battery units involved during charging and discharging of the stacked all-solid-state secondary battery.

MODE FOR INVENTION

Hereinafter, an embodiment of the all-solid-state secondary battery of the present invention will be described.

Figure 1:
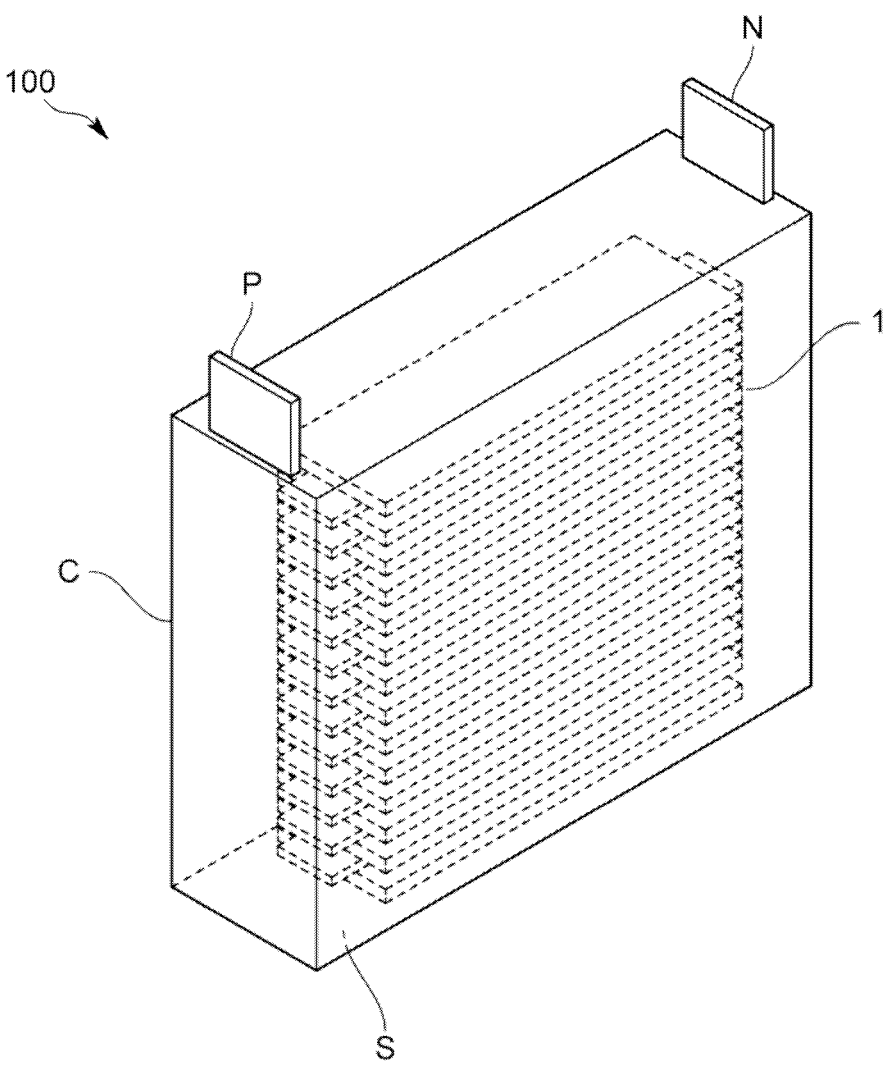
FIG. 1 is a schematic view of an all-solid-state secondary battery according to an embodiment.
Figure 2:
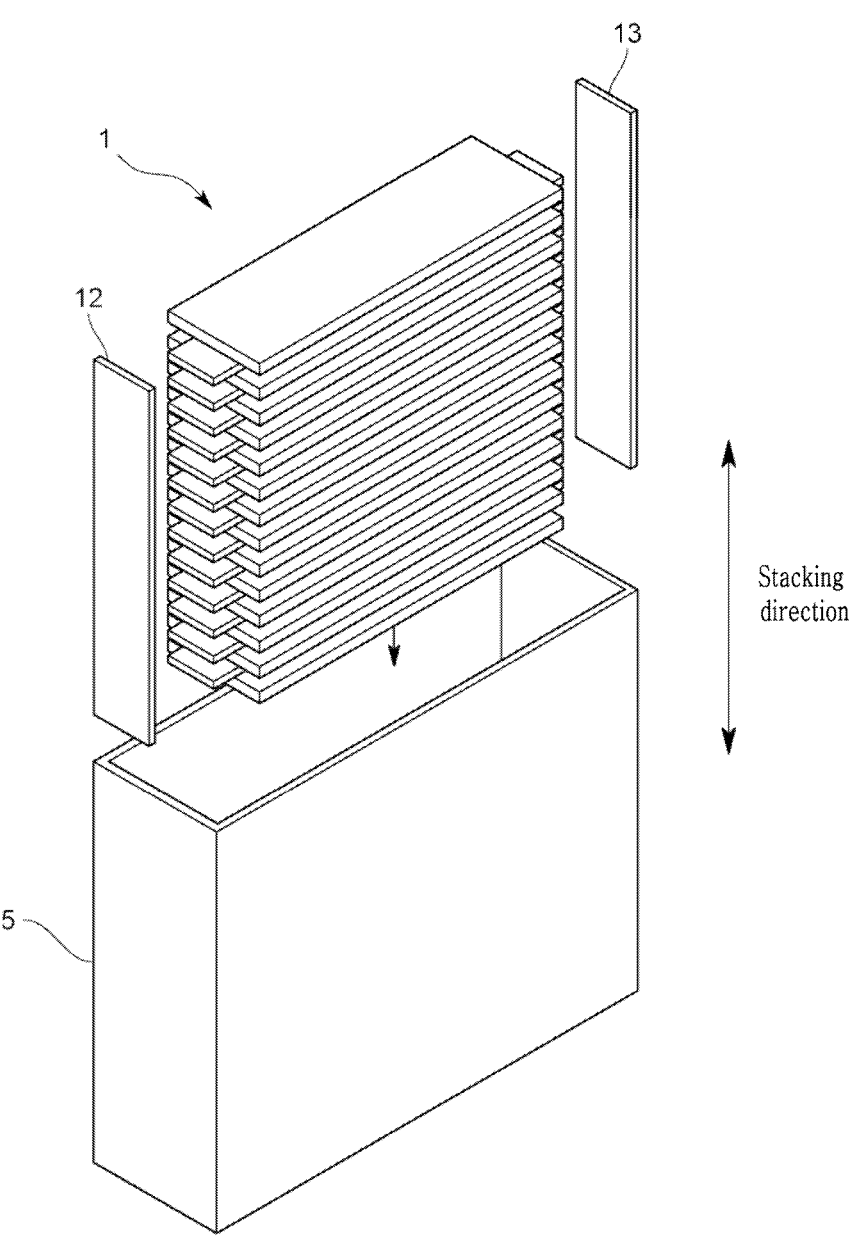
FIG. 2 is an exploded view of an all-solid-state secondary battery according to an embodiment.

The all-solid-state secondary battery 100 according to an exemplary embodiment is a lithium secondary battery in which lithium ions are charged and discharged while moving between the positive electrode and the negative electrode. As shown in FIGS. 1 and 2, the all-solid-state secondary battery 100 includes a battery case C and a battery body 1 accommodated in the battery case C.

The battery case C may be a prismatic (cuboid) and made of metal such as aluminum. The battery case (C) has three pairs of opposite surfaces with a different area, and the opposite surface (S) with the smallest area among them is used as a bottom surface. On the other hand, on the bottom surface, a positive terminal (P) and a negative terminal (N) electrically connected to the battery body 1 are installed.

Figure 3:
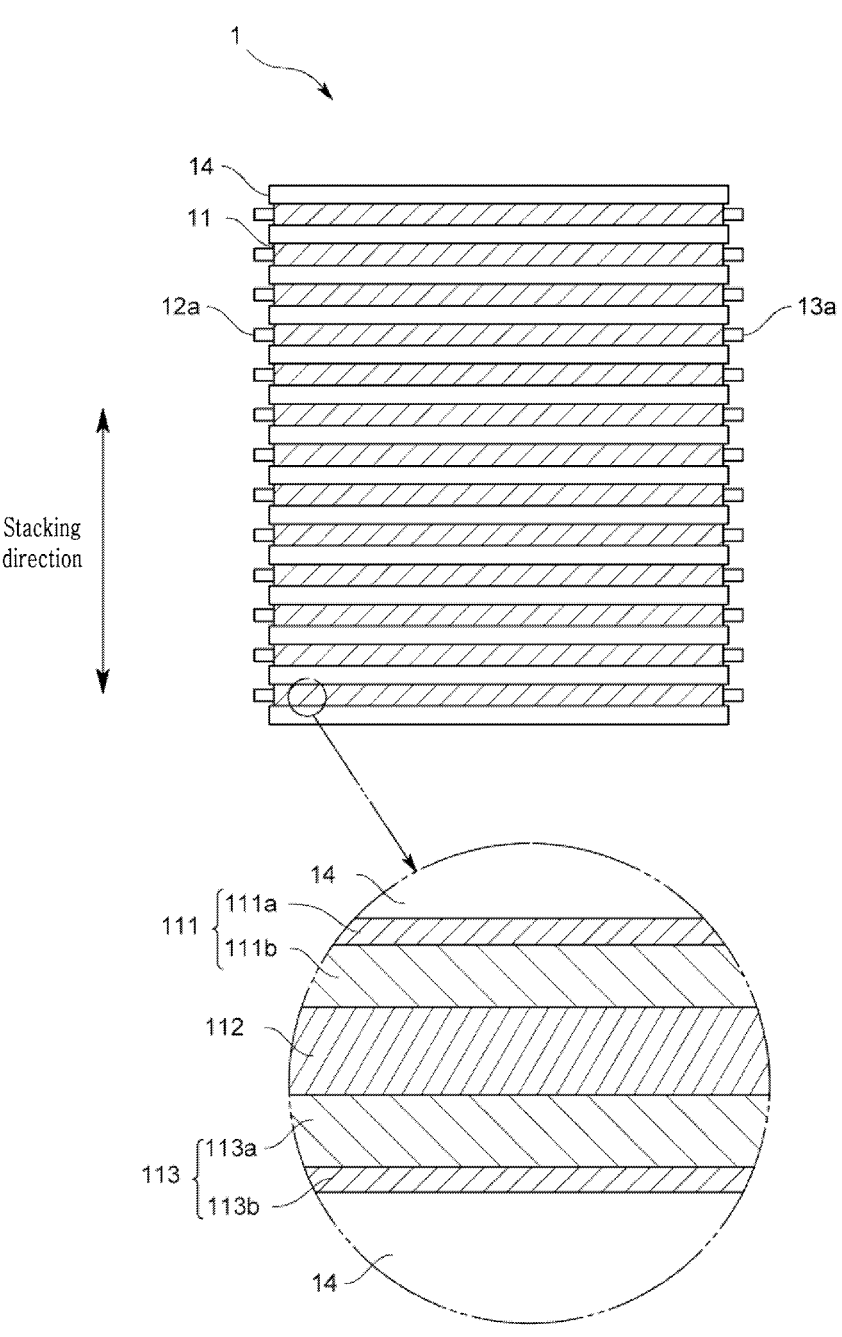
FIG. 3 is a schematic view of a battery body of an all-solid-state secondary battery according to an embodiment.

The battery body 1 is a stacked type in which a plurality of (13 in FIG. 1) battery units 11 are stacked, and has a substantially rectangular parallelepiped shape. As shown in FIGS. 2 and 3, each battery unit 11 is sheet-shaped and composed of a positive electrode layer 111, a solid electrolyte layer 112, and a negative electrode layer 113 which are sequentially stacked in a height direction. In addition, in the battery body 1, the plurality of battery units 11 are stacked and overlapped in the height direction. In the battery body 1 housed in the battery case C, a stacking direction of the battery units 11 coincides with the height direction (i.e., a direction perpendicular to the bottom surface) of the battery case C.

(Positive Electrode Layer)

The positive electrode layer 111 includes a positive electrode current collector layer 111$a$ and a positive electrode active material layer 111$b$ sequentially disposed toward the negative electrode layer 113.

The positive electrode current collector layer 111$a$ has a rectangular shape in planar view, such as a sheet shape, a foil shape, or a plate shape. A material constituting the positive electrode current collector layer 111$a$ is not particularly limited, a known material used in an all-solid-state battery may be used, and for example, stainless steel, aluminum, copper, nickel, iron, titanium, carbon, or an alloy thereof may be used.

The positive electrode active material layer 111$b$ reversibly absorbs and releases lithium ions. The positive electrode active material layer 111$b$ includes a minimum positive electrode active material and may further include a solid electrolyte. In addition, if necessary, a conductive aid, a binder, a filler, a dispersant, and the like, which are known materials included in the positive electrode active material layer of the all-solid-state battery, may be included.

The material of the positive electrode active material is not particularly limited, and a known material that can be used for an all-solid-state battery may be used. For example, the positive electrode active material includes lithium salts such as lithium cobaltate, lithium nickelate, lithium nickel cobaltate, lithium nickel cobalt aluminate, nickel cobalt lithium manganate, lithium manganate, lithium iron phosphate, nickel sulfide, copper sulfide, sulfur, iron oxide, or vanadium oxide. The positive electrode active material may be used alone, respectively, and may also be used in combination of 2 or more types.

In addition, the positive electrode active material preferably includes a lithium salt of a transition metal oxide having a layered rock salt structure among the lithium salts. The "layered" means a thin sheet-like form. In addition, the "rock salt structure" refers to a sodium chloride-type structure, which is a type of crystal structure, and specifically, a structure that face-centered cubic lattices formed by each of cations and anions are displaced by ½ of each unit grid ridge from each other Examples of the lithium salt of the transition metal oxide having the layered rock salt structure may include lithium salts of ternary transition metal oxides such as LiNi$_x$Co$_y$Al$_z$O$_2$ (NCA), or LiNi$_x$Co$_y$Mn$_z$O$_2$ (NCM) (provided that 0<x<1, 0<y<1, 0<z<1, and x+y+z=1).

When the positive electrode active material includes a lithium salt of ternary transition metal oxide with the layered rock salt structure, energy density and thermal stability of the all-solid-state secondary battery 100 may be improved.

The positive electrode active material may be coated with a coating layer. The coating layer may use any material known to be used as a coating layer of a positive electrode active material of the all-solid-state secondary battery 100 and may include, for example, $Li_2O$—$ZrO_2$ and the like.

In addition, the positive electrode active material is formed of a lithium salt of ternary transition metal oxide such as NCA, NCM, or the like. When nickel (Ni) is included as the positive electrode active material, capacity density of the all-solid-state secondary battery 100 may be increased, and metal elution of the positive electrode active material may be reduced. Accordingly, the all-solid-state secondary battery 100 according to an embodiment may exhibit improved long-term reliability and cycle characteristics.

The positive electrode active material may have a particle shape such as a sphere, an oval, and the like. In addition, a particle diameter of the positive electrode active material may be particularly not limited and may be in a range applicable to a positive electrode active material of a conventional all-solid-state secondary battery. Furthermore, a content of the positive electrode active material of the positive electrode active material layer 111b is not particularly limited but in a range applicable to the positive electrode layer 111 of the conventional all-solid-state secondary battery.

In addition, examples of a conductive aid which may be blended into the positive electrode active material layer 111b may be, for example, graphite, carbon black, acetylene black, ketjen black, carbon fiber, metal powder, and the like. In addition, examples of a binder which may be blended into the positive electrode active material layer 111b may be, for example, styrene butadiene rubber, polytetrafluoroethylene, polyvinylidene fluoride, polyethylene, and the like. In addition, a filler, a dispersant, an ion conductive aid, and the like which may be blended into the positive electrode active material layer 111b may be a known material generally used for an electrode of an all-solid-state secondary battery.

(Solid Electrolyte Layer)

The solid electrolyte layer 112 is disposed between the positive electrode layer 111 and the negative electrode layer 113 (specifically, between the positive electrode active material layer 111b and the negative electrode active material layer 113a). The solid electrolyte layer 112 has a rectangular shape in plan view, such as a sheet shape, a foil shape, or a plate shape, and includes a solid electrolyte capable of moving ions. The solid electrolyte layer 112 contains a solid electrolyte capable of moving ions. The material of the solid electrolyte is not particularly limited, and a known material that can be used in an all-solid-state battery may be used, and examples thereof include a sulfide solid electrolyte, an oxide solid electrolyte, and a polymer electrolyte.

The sulfide-based solid electrolyte material included in the solid electrolyte may be, for example, $Li_2S$—$P_2S_5$, $Li_2S$—$P_2S_5$—LiX (X is a halogen element (e.g., I or Cl)), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$Si_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m is an integer and Z is any one of Ge, Zn, or Ga), $Li_2S$–$GeS_2$, $Li_2S$—$SiS_2$—$Li_3PO_4$, $Li_2S$—$SiS_2$—$Li_pMO_q$ (p and q are integers and M is P, Si, Ge, B, Al, Ga or In), and the like. The sulfide-based solid electrolyte material is produced by treating a starting material (e.g., $Li_2S$, $P_2S_5$, etc.) by a melt quenching method or a mechanical milling method. In addition, heat treatment may be performed after such treatment. The solid electrolyte may be amorphous or crystalline, and both may be in a mixed state.

Also, as the solid electrolyte, it is preferable to use a material containing at least one element selected from sulfur, silicon, phosphorus and boron among the sulfide solid electrolyte materials. Through the material, lithium conductivity of the solid electrolyte layer 112 may be improved and battery characteristics of the all-solid-state secondary battery 100 may be improved. In particular, it is preferable to use one containing sulfur (S), phosphorus (P) and lithium (Li) as the material used for the solid electrolyte, and particularly, it is more preferable to use one containing $Li_2S$—$P_2S_5$.

When $Li_2S$—$P_2S_5$ is included as a sulfide-based solid electrolyte material forming the solid electrolyte, a mixing mole ratio of $Li_2S$ and $P_2S_5$ may be, for example, in a range of $Li_2S$:$P_2S_5$=50:50 to 90:10. In addition, the solid electrolyte layer 112 may further include a binder. The binder included in the solid electrolyte layer 112 may include, for example, styrene-butadiene rubber, polytetrafluoroethylene, polyvinylidene fluoride, polyethyleneoxide, and the like. The binder included in the solid electrolyte layer 112 may be the same as or different from that of the positive electrode active material layer 111b.

(Negative Electrode Layer)

The negative electrode layer 113 includes a negative electrode current collector layer 113b and a negative electrode active material layer 113a sequentially disposed to the direction to the positive electrode layer 111.

The negative electrode current collector layer 113b has a rectangular shape in planar view, such as a sheet shape, a foil shape, or a plate shape. A material included in the negative electrode current collector layer 113b is not particularly limited, and a known material that can be used in an all-solid-state battery may be appropriately used. Examples of the material include stainless steel, aluminum, copper, nickel, iron, titanium, carbon, and the like.

The negative electrode active material layer 113a may contain one or more negative electrode active materials forming an alloy or a compound with lithium. When the all-solid-state secondary battery 100 according to an embodiment is overcharged, the negative electrode active material contained in the negative electrode active material layer 113a and lithium ions moved from the positive electrode layer 111 may form an alloy or a compound, precipitating lithium metal on one side or both sides of the negative electrode active material layer 113a.

Specifically, at the initial charging, the negative electrode active material of the negative electrode active material layer 113a and the lithium ions may form an alloy or a compound, so that lithium may be absorbed in the negative electrode active material layer 113a. After the absorption, when capacity of the negative electrode active material layer 113a is exceeded, lithium metal is precipitated on one side or both sides of the negative electrode active material layer 113a. The lithium metal forms a metal layer. Since the lithium metal is formed, while diffusing through the negative electrode active material capable of forming an alloy or a compound with lithium ions, the lithium metal is uniformly formed along the surface of the negative electrode active material layer 113a instead of a dendritic phase. During discharges, the lithium metal of the negative electrode active material layer 113a and the metal layer is ionized and moves toward the positive electrode active material layer 111b. Accordingly, the lithium metal may be resultantly used as a negative electrode active material, improving energy density.

In an embodiment, a sum of the thicknesses of the negative electrode current collector and the negative electrode active material layer 113a included in each battery unit 11 may be smaller than the thickness of the lithium metal layer precipitated between the negative electrode current collector and the negative electrode active material layer 113a in a state in which the all-solid-state battery is fully charged.

In addition, when the specific capacity per unit area of the positive electrode layer 111 is X [mAh/cm$^{-2}$], a thickness of the lithium metal layer precipitated from the negative electrode layer 113 in the stacking direction in a fully charged state is 4.85×X [μm].

A negative electrode active material for realizing this function may be, for example, at least one selected from a group consisting of amorphous carbon, Au, Pt, Pd, Si, Al, Bi, Sn, In, and Zn. Specific examples of the amorphous carbon may include, for example, carbon black such as acetylene black, furnace black, and ketjen black, and the like, graphene, and the like.

A shape of the negative electrode active material is not particularly limited but may be a particle shape, wherein the negative electrode active material may form a uniform layer, for example, a plating layer. When the negative electrode active material has a particle shape, lithium ions may go through gaps between subdivided negative electrode active material and form a lithium metal layer between the negative electrode active material layer 113a and the negative electrode current collector. On the other hand, when the plating layer is formed, a metal layer is precipitated between the negative electrode active material layer 113a and the solid electrolyte layer 112.

The negative electrode active material layer 113a may further include a binder. By including the binder, the negative electrode active material layer 113a may be stabilized on the negative electrode current collector. The binder may be, for example, any one of a styrene butadiene rubber, polytetrafluoroethylene, polyvinylidene fluoride, polyethylene, and a combination thereof.

In addition, in the negative electrode active material, an additive, for example, a filler, a dispersant, and an ion conductive aid used in a conventional all-solid-state secondary battery may be appropriately mixed.

The battery body 1 may include a positive electrode current collector terminal 12 electrically connected to the positive electrode current collector layer 111a of each battery unit 11 and a negative electrode current collector terminal 13 electrically connected to the negative electrode current collector layer 113b. The positive electrode current collector terminal 12 and the negative electrode current collector terminal 13 all are sheet-shaped and may be disposed along the stacking direction of the battery body 1. The positive electrode current collector terminal 12 and the negative electrode current collector terminal 13 respectively may be connected to the positive terminal (P) and the negative terminal (N) respectively protruding from the battery case (C), and electric power generated in each battery unit 11 may be exported to the outside through the positive electrode current collector terminal 12 and the negative electrode current collector terminal 13. Each battery unit 11 includes a positive electrode current collector tab 12a and a negative electrode current collector tab 13a protruding in a direction perpendicular to the stacking direction of each battery unit 11, which are respectively connected to the positive electrode current collector terminal 12 and the negative electrode current collector terminal 13. In an embodiment, each battery unit 11 of the battery body 1 may be connected in parallel to each other.

(Buffer Layer)

The all-solid-state secondary battery 100 according to an embodiment battery body 1 may include one or more buffer layers installed between the adjacent battery units 11. The buffer layer 14 may be installed between all the adjacent battery units 11 or between the battery units 11 at both ends along the stacking direction and the battery case (C).

Each buffer layer 14 has a rectangular shape such as a sheet shape or a plate shape in a planar view, wherein a thickness direction of the buffer layer 14 may coincide with the stacking direction of the battery units 11. When viewed in the stacking direction of the battery units 11, since each buffer layer 14 has a larger area than that of each battery unit 11, the buffer layer 14 may be installed to cover the entire region excluding the positive electrode current collector tab 12a and the negative electrode current collector tab 13a of the battery unit 11. In addition, the thickness of each buffer layer 14 may be set so that a sum thereof is greater than a sum of changes of the thickness of each battery unit 11 along the stacking direction accompanying charging and discharging.

The buffer layer 14 may absorb volume changes (expansion) of the battery units 11 according to charges and discharges, is composed of members capable of elastic deformation, and specifically, may be formed of a material with a smaller elastic modulus than that of the positive and negative electrode current collectors. The buffer layer 14 may be formed of a material of which a slope of a stress displacement curve is less than or equal to 200 MPa or less than or equal to 50 MPa at less than or equal to 80% of displacement or less than or equal to 10 MPa at less than or equal to 50% of displacement. A material of the buffer layer 14 may be an epoxy resin, an acrylic resin, a polyimide resin, a polyester resin, a polypropylene resin, a polyamide resin, a polystyrene resin, a polyvinyl chloride resin, a polycarbonate resin, a fluororesin such as PTFE, a silicone rubber and the like, but is not limited thereto. Each buffer layer 14 may be composed of a single material, or may be composed of a combination of several materials. Also, each buffer layer 14 may include the same material or may include different materials. In addition, the buffer layer 14 may include an insulating material, and may insulate each battery unit 11. The insulating material may have a surface resistance value of greater than or equal to $1.0×10^{17}$ Ω·cm$^2$, and specifically, a fluororesin such as PTFE or silicone rubber.

In an embodiment, between the battery unit 11 and the buffer layer 14 of the battery body 1, an insulating film having a smaller thickness than the buffer layer 14 may be installed. The material of the insulating film may be, for example, a PET (polyethylene terephthalate) film, a PTFE (polytetrafluoroethylene) film, a kapton film, a polyimide film, an imide film, and the like, but is not limited thereto.

The all-solid-state secondary battery 100 according to an embodiment, since the buffer layer 14 installed between the battery units 11, a pressure generated, when each battery unit 11 expands by charging the all-solid-state secondary battery 100, may be distributed, reducing a bias of the pressure applied to each battery unit 11 due to charges and discharges. In addition, the electrolyte layer may be suppressed from cracking or deformation which may occur during repeated charges and discharges, thereby suppressing deterioration of battery characteristics such as cycle characteristics.

The present invention is not limited to the aforementioned embodiments.

In the battery body 1 of an embodiment, each battery unit 11 may be connected in parallel to each other but is not limited thereto. In other words, each battery unit 11 may be connected in series with each other. In this case, each buffer layer 14 includes a conductive material to supply a current between the battery units 11. The conductive material may have a sheet resistance value of less than or equal to 0.1 $\Omega/cm^2$ and specifically, may be a copper foil or aluminum foil, conductive double-sided tape and the like. In addition, each battery unit 11 may be connected to each other in a mixture of parallel and series.

In addition, the battery body 1 may be housed into the battery case (C) with an opposite side with the smallest area of the battery case (C) as the bottom surface and a height direction as a stacking direction but is not limited thereto. In another embodiment, the battery body 1 may be housed into the battery case (C) with one of the other opposite sides rather than the opposite side with the smallest area of the battery case (C) as the bottom surface and the height direction as a stacking direction but is not limited thereto.

Figure 4:
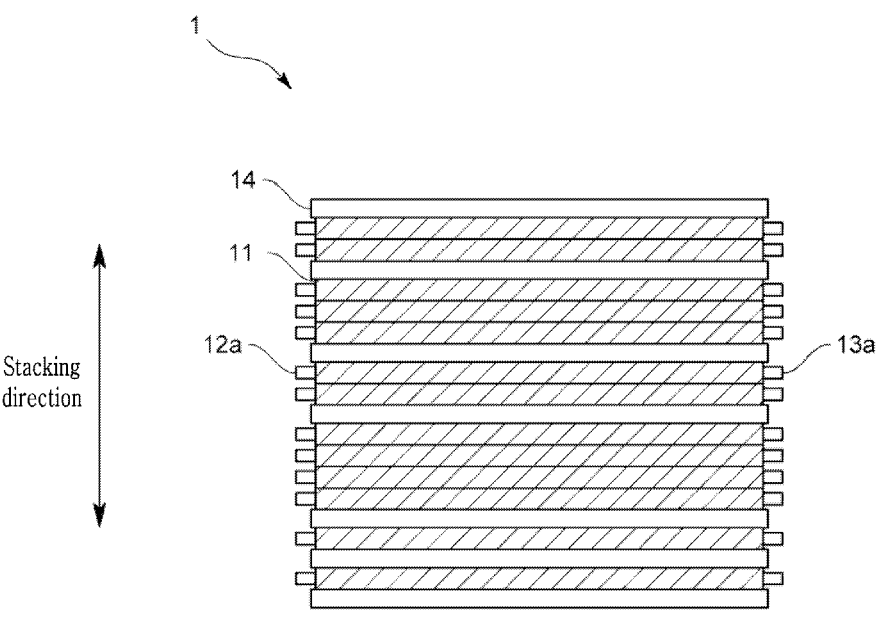
FIG. 4 is a schematic view of a battery body of an all-solid-state secondary battery according to an embodiment different from FIG. 3.

In an embodiment, the buffer layer 14 may be installed between the battery units 11 at both ends of the battery body 1 along the stacking direction of all the battery units 11 adjacent to the buffer layer 14 of the battery body 1 and the battery case (C) but is not limited thereto. In another embodiment, for example, as shown in FIG. 4, the buffer layer 14 may be installed to face up and down along the stacking direction of the plurality of battery units 11. Herein, an insulation layer such as the insulating film and the like may be installed between each battery unit 11.

In an embodiment, in the battery body 1, a lithium metal layer may not be precipitated on the negative electrode layer 113. For example, when a material capable of reversibly intercalating/deintercalating lots of lithium ions such as silicon is used, a volume of the negative electrode active material may be several times changed. Herein, a thickness sum of the positive electrode layer 111, the solid electrolyte layer 112, and the negative electrode layer 113 of each battery unit 11 may be larger in a fully charged state than in a discharged state.

EXAMPLES

The present invention will be described in more detail through the following examples. The present invention is not limited by the following examples, but can be practiced with modifications within the range suitable for the above and below meanings, and all of these are included in the technical scope of the present invention.

Example 1

The battery characteristics by the presence or absence of a buffer layer between battery units were evaluated.
1. Manufacture of Stacked All-Solid-State Secondary Battery Cell
   (1) Preparation of Positive Electrode Structure
   $LiNi_{0.8}Co_{0.15}Al_{0.05}O_2$ (NCA) ternary powder as a positive electrode active material, $Li_2S$—$P_2S_5$ (80:20 mol %) amorphous powder as a sulfide-based solid electrolyte, and vapor-grown carbon fiber powder as a positive electrode layer conductive material (conductive aid) were weighed in a mass ratio of 60:35:5 and mixed by using a rotating and revolving mixer.

Subsequently, a dehydrated xylene solution in which styrene butadiene rubber (hereinafter, SBR) as a binder was dissolved was added to the mixed powder so that SBR was included in an amount of 5.0 wt % based on a total weight of the mixed powder. In addition, an appropriate amount of dehydrated xylene was added to the primary mixture to adjust viscosity. Furthermore, in order to improve dispersibility of the mixed powder, zirconia balls with a diameter of 5 mm were added thereto so that the mixed powder, the zirconia balls, and an empty space should be respectively ⅓ of a kneading container, preparing a third mixed solution. The third mixed solution was put into a rotating and revolving mixer and then, stirred at 3000 rpm for 3 minutes, preparing a coating solution for a positive electrode layer.

Subsequently, after preparing a 20 μm-thick aluminum film current collector as a positive electrode current collector and placing it on a desktop screen printing machine, the coating solution for a positive electrode layer was coated thereon by using a metal mask having a diameter of 2.0 cm×2.0 cm and a thickness of 150 μm. The sheet coated with the coating solution for a positive electrode layer was dried on a hot plate at 60° C. for 30 minutes, vacuum-dried at 80° C. for 12 hours to form a positive electrode layer on the positive electrode current collector. After the drying, the positive electrode current collector and the positive electrode layer had a total thickness of 165 μm or so.
(2) Manufacture of Negative Electrode Structure
   Graphite powder (vacuum-dried at 80° C. for 24 hours) as a negative electrode active material and PVDF as a binder were respectively weighed in a mass ratio of 95.0:5.0. Subsequently, the negative electrode active material, the binder, and an appropriate amount of NMP were put in a rotating and revolving mixer and then, stirred at 3000 rpm for 3 minutes and defoamed for 1 minute to prepare a coating solution for a negative electrode layer.

Subsequently, a 16 μm-thick copper foil current collector was prepared as a negative electrode current collector, and the coating solution for a negative electrode layer was coated on the copper foil current collector by using a blade. The coating solution for a negative electrode layer on the copper foil current collector had a thickness (gap) of 150 μm or so.

The sheet coated with the coating solution for a negative electrode layer was placed in a drier heated to 80° C. and dried for 15 minutes. Subsequently, the dried sheet was vacuum-dried at 80° C. for 24 hours, manufacturing a negative electrode structure. The negative electrode structure had a thickness of 140 μm or so.
(3) Manufacture of Electrolyte Layer
   A dehydrated xylene solution in which SBR was dissolved was added to $Li_2S$—$P_2S_5$ (80:20 mol %) amorphous powder as a sulfide-based solid electrolyte so that SBR was included in an amount of 2.0 wt % based on a total weight of the following primary mixture. Subsequently, an appropriate amount of dehydrated xylene was added to the primary mixture to adjust viscosity, preparing a secondary mixture. Subsequently, in order to improve dispersibility of the mixed powder, zirconia balls with a diameter of 5 mm were added thereto so that the mixed powder, the zirconia balls, and an empty space should be respectively ⅓ of a kneading container, preparing a third mixed solution. The third mixed solution was put in a rotating and revolving mixer and stirred at 3000 rpm for 3 minutes, preparing a coating solution for an electrolyte layer.

The negative electrode structure was placed on a desktop screen printing machine, and the coating solution for an electrolyte layer was applied on the negative electrode structure by using a 500 μm-thick metal mask. The sheet coated with the coating solution for an electrolyte layer was dried on a 40° C. hot plate for 10 minutes and vacuum-dried again at 40° C. for 12 hours, forming an electrolyte layer on the negative electrode structure. After the drying, the electrolyte layer had a total thickness of 300 μm or so.

(4) Manufacture of Single Cell

The sheet composed of the negative electrode structure and the electrolyte layer and the positive electrode structure were respectively pierced with a Thompson blade and pressed with a roll press machine with a roll gap of 150 μm to laminate the electrolyte of the sheet and the positive electrode layer of the positive electrode structure in a dry lamination method, manufacturing an all-solid-state secondary battery single cell (battery unit). The single cell had a layer thickness of 400 μm or so.

(5) Manufacture of Stacked All-Solid-State Secondary Battery Cell

The single cells were stacked to manufacture two stacked all-solid-state secondary battery cells.

Figure 5:
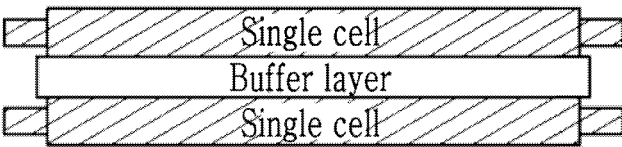
FIG. 5 is a schematic view of a sample of an all-solid-state secondary battery according to an embodiment.
Figure 5:
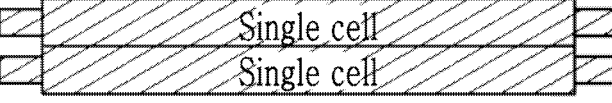

As shown in (a) of FIG. 5, the one was manufactured by preparing single cells and disposing an about 500 μm-thick PTFE sheet as a buffer layer between the single cells and then, housing them in an aluminum laminate film equipped with a terminal end, evacuating the film to 100 Pa with a vacuum cleaner, and sealing the film to package them (Sample A).

The other, as shown in (b) of FIG. 5, was manufactured by disposing noe buffer layer between the single cells, housing stacked single cells in an aluminum laminate film equipped with a terminal end, evacuating the film to 100 Pa with a vacuum cleaner, and sealing the film to package the stacked single cells (Sample B).

2. Battery Characteristics Evaluation

Each all-solid-state secondary battery of Sample A and Sample B was measured with respect to charge and discharge capacity (mAh) by using a charge and discharge evaluation device (TOSCAT-3100, Dongyang System). The cells were charged to 4.25 V at a current of 0.1 mA and discharged to 2.50 V at a current of 0.1 mA at 60° C. and then, measured with respect to charge and discharge capacity. The results are shown in FIG. 6.

Figure 6:
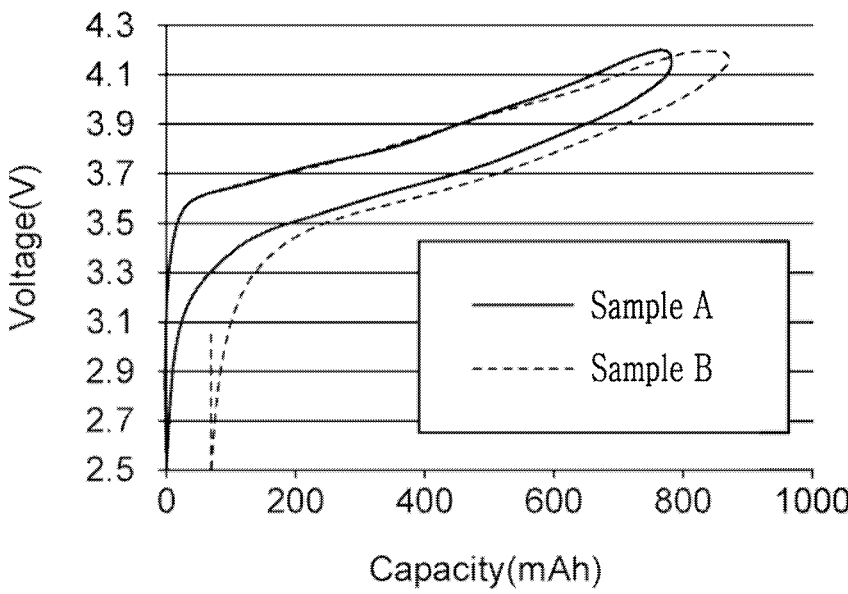
FIG. 6 shows an evaluation result of battery characteristic evaluation according to an embodiment.

As shown in FIG. 6, the solid secondary battery cell of Sample A in which the buffer layer was disposed between the single cells exhibited the same charge capacity and discharge capacity. However, the all-solid-state secondary battery cell of Sample B in which the buffer layer was not disposed between the single cells exhibited increased charge capacity due to a micro-short circuit, resulting in insufficient battery efficiency. Accordingly, the buffer layer disposed between the single cells suppressed a short circuit and thus improved cycle characteristics of an all-solid-state secondary battery cell.

DESCRIPTION OF SYMBOLS

100: all-solid-state secondary lithium battery
1: battery body
11: battery unit
111: positive electrode layer
111a: positive electrode current collector layer
111b: positive electrode active material layer
112: solid electrolyte layer
113: negative electrode layer
113a: negative electrode active material layer
113b: negative electrode current collector layer
14: buffer layer

The invention claimed is:

1. An all-solid-state secondary battery, comprising
a stacked all-solid-state secondary battery comprising a plurality of battery units, each of the plurality of battery units comprising a positive electrode layer,
a solid electrolyte layer, and
a negative electrode layer, wherein the positive electrode layer, the solid electrolyte layer and the negative electrode layer are sequentially stacked in a stacking direction, and
a buffer layer is formed between adjacent battery units,
wherein, for at least one battery unit of the plurality of battery units, the buffer layer has a smaller elastic modulus than those of the positive electrode layer and the negative electrode layer, and
wherein, when viewed in the stacking direction, an area of the buffer layer is larger than an area of the at least one battery unit.

2. The all-solid-state secondary battery of claim 1, wherein a sum of a thickness of the buffer layer along the stacking direction is greater than a change in thickness along the stacking direction from a fully charged state to a discharged state of the at least one battery unit.

3. The all-solid-state secondary battery of claim 1, wherein lithium ions move between the positive electrode layer and the negative electrode layer to charge and discharge each of the plurality of battery units.

4. The all-solid-state secondary battery of claim 3, wherein, for the at least one battery unit, the negative electrode layer comprises
a negative electrode current collector,
a negative electrode active material layer, and
a lithium metal layer between the negative electrode current collector and the negative electrode active material layer, and
a sum of thicknesses of the negative electrode current collector and the negative electrode active material layer along the stacking direction in a fully charged state is smaller than a thickness of the lithium metal layer along the stacking direction.

5. The all-solid-state secondary battery of claim 4, wherein, for the at least one battery unit, a specific capacity per unit area of the positive electrode layer is X [mAh/cm$^{-2}$], and a thickness of the lithium metal layer in a fully charged state along the stacking direction is greater than or equal to 4.85×X μm.

6. The all-solid-state secondary battery of claim 1, further comprising a rectangular case for accommodating the plurality of battery units and the buffer layer, wherein the case has an opposite surface having a smallest area among three pairs of opposite surfaces as a bottom surface, and the plurality of battery units and the buffer layer are accommodated in the case so as to be stacked along a height direction.

7. The all-solid-state secondary battery of claim 1, wherein the battery units are connected in parallel to each other and the buffer layer between the battery units comprises an insulating material.

8. The all-solid-state secondary battery of claim 7, wherein an insulating film having a thickness smaller than that of the buffer layer is between the buffer layer and a battery unit of the plurality of battery units adjacent to the buffer layer.

9. The all-solid-state secondary battery of claim 1, wherein the battery units are connected in series with each other, and the buffer layer between the battery units comprises a conductive material.

* * * * *